United States Patent
Stephens (10) Patent No.: US 11,003,447 B2
(45) Date of Patent: May 11, 2021

(54) VECTOR ARITHMETIC AND LOGICAL INSTRUCTIONS PERFORMING OPERATIONS ON DIFFERENT FIRST AND SECOND DATA ELEMENT WIDTHS FROM CORRESPONDING FIRST AND SECOND VECTOR REGISTERS

(71) Applicant: ARM LIMITED, Cambridge (GB)

(72) Inventor: Nigel John Stephens, Cambridgeshire (GB)

(73) Assignee: ARM Limited, Cambridge (GB)

( * ) Notice: Subject to any disclaimer, the term of this patent is extended or adjusted under 35 U.S.C. 154(b) by 10 days.

(21) Appl. No.: 15/743,745

(22) PCT Filed: Jun. 23, 2016

(86) PCT No.: PCT/GB2016/051868
§ 371 (c)(1),
(2) Date: Jan. 11, 2018

(87) PCT Pub. No.: WO2017/021681
PCT Pub. Date: Feb. 9, 2017

(65) Prior Publication Data
US 2018/0203692 A1    Jul. 19, 2018

(30) Foreign Application Priority Data
Jul. 31, 2015  (GB) ...................... 1513511

(51) Int. Cl.
*G06F 9/30*    (2018.01)
*G06F 17/16*   (2006.01)

(52) U.S. Cl.
CPC ........ *G06F 9/30014* (2013.01); *G06F 9/3001* (2013.01); *G06F 9/30036* (2013.01); *G06F 17/16* (2013.01)

(58) Field of Classification Search
CPC .................................................. G06F 9/30036
See application file for complete search history.

(56) References Cited

U.S. PATENT DOCUMENTS

| 6,408,320 B1 | 6/2002 | Shiell |
| 2005/0125631 A1* | 6/2005 | Symes ................ G06F 9/30145 712/22 |

(Continued)

FOREIGN PATENT DOCUMENTS

| GB | 2 474 901 | 5/2011 |
| GB | 2 488 985 | 9/2012 |

(Continued)

OTHER PUBLICATIONS

International Search and Written Opinion of the ISA of PCT/GB2016/051868, dated Sep. 23, 2016, 12 pages.

(Continued)

*Primary Examiner* — Jacob Petranek
(74) *Attorney, Agent, or Firm* — Nixon & Vanderhye, P.C.

(57) ABSTRACT

A data processing system (2) supports vector processing operations performed upon vector operands comprising a plurality of vector operand elements. The data processing system includes a processor (4) having an instruction decoder (14) which decodes mixed-element-sized vector arithmetic instructions to generate control signals (16) which control processing circuitry (18) to perform arithmetic operations upon a first vector of first source operand elements $a_i$ of a first bit size A, and a second vector of second source operand elements $b_j$ of a second bit size B. The second bit size B is greater than the first bit size A.

17 Claims, 5 Drawing Sheets

(56) References Cited

U.S. PATENT DOCUMENTS

| | | | |
|---|---|---|---|
| 2005/0240870 A1* | 10/2005 | Aldrich | H04N 19/44 715/700 |
| 2014/0195783 A1* | 7/2014 | Karthikeyan | G06F 9/30036 712/222 |
| 2015/0012724 A1* | 1/2015 | Lutz | G06F 9/3887 712/22 |
| 2015/0082010 A1* | 3/2015 | Martin | G06F 9/30018 712/225 |
| 2017/0024209 A1* | 1/2017 | Mahurin | G06F 9/3001 |
| 2018/0113708 A1* | 4/2018 | Corbal | G06F 9/3001 |

FOREIGN PATENT DOCUMENTS

| | | |
|---|---|---|
| TW | 201337748 A | 9/2013 |
| TW | 201528131 A | 7/2015 |
| WO | WO 2013/095607 | 6/2013 |

OTHER PUBLICATIONS

Combined Search and Examination Report for GB 1513511.4, dated Feb. 1, 2016, 8 pages.
Telephone consultation (EPO Form 2906 01.91TR) in corresponding EP Application No. 16 732 707.1 dated Jul. 29, 2019 (6 pages).
Office Action issued in Taiwanese Application No. 105122689 dated Jun. 24, 2020, English Translation, pp. 1-18.
Office Action issued in Japanese Application No. 2018-503593 dated Sep. 1, 2020, English Translation pp. 1-5.
Office Action in corresponding Taiwanese Office Action 105122680 dated Dec. 4, 2020 with translation, 18 pages.
Office Action of Indian Application No. 201847002527 dated Mar. 19, 2021, 7 pages, translated.

* cited by examiner

VECTOR ARITHMETIC AND LOGICAL INSTRUCTIONS PERFORMING OPERATIONS ON DIFFERENT FIRST AND SECOND DATA ELEMENT WIDTHS FROM CORRESPONDING FIRST AND SECOND VECTOR REGISTERS

This application is the U.S. national phase of International Application No. PCT/GB2016/051868 filed Jun. 23, 2016, which designated the U.S. and claims priority to GB Patent Application No. 1513511.4 filed Jul. 31, 2015, the entire contents of each of which are hereby incorporated by reference.

This disclosure relates to the field of data processing systems. More particularly, this disclosure relates to data processing systems supporting vector arithmetic instructions.

It is known to provide data processing systems which support vector arithmetic instructions with plurality of vector elements serving as respective input operands. A vector arithmetic instruction may take two such vector input operands and perform an arithmetic operation specified by the instruction upon respective pairs of vector elements from within the two vector operands. Vector processing facilitates parallel computation.

At least some embodiments of the present disclosure provides an apparatus for processing data comprising:
processing circuitry to perform processing operations; and decoder circuitry to decode program instructions to generate control signals to control said processing circuitry to perform said processing operations; wherein
said decoder circuitry is responsive to at least one mixed-element-sized vector arithmetic instruction to generate control signals to control said processing circuitry to perform an arithmetic processing operation upon a first vector of first source operand elements of a first bit size and a second vector of second source operand elements of a second bit size, said second bit size being greater than said first bit size.

At least some embodiments of the present disclosure provide an apparatus for processing data comprising:
processing means for performing processing operations; and decoder means for decoding program instructions to generate control signals to control said processing circuitry to perform said processing operations; wherein
said decoder means is responsive to at least one mixed-element-sized vector arithmetic instruction to generate control signals to control said processing means to perform an arithmetic processing operation upon a first vector of first source operand elements of a first bit size and a second vector of second source operand elements of a second bit size, said second bit size being greater than said first bit size.

At least some embodiments of the present disclosure provide a method of processing data comprising:
decoding at least one mixed-element-sized vector arithmetic instruction to generate control signals to control processing circuitry to perform an arithmetic processing operation upon a first vector of first source operand elements of a first bit size and a second vector of second source operand elements of a second bit size, said second bit size being greater than said first bit size.

Embodiments will now be described by way of example only, with reference to the accompanying drawings in which.

Figure 1:
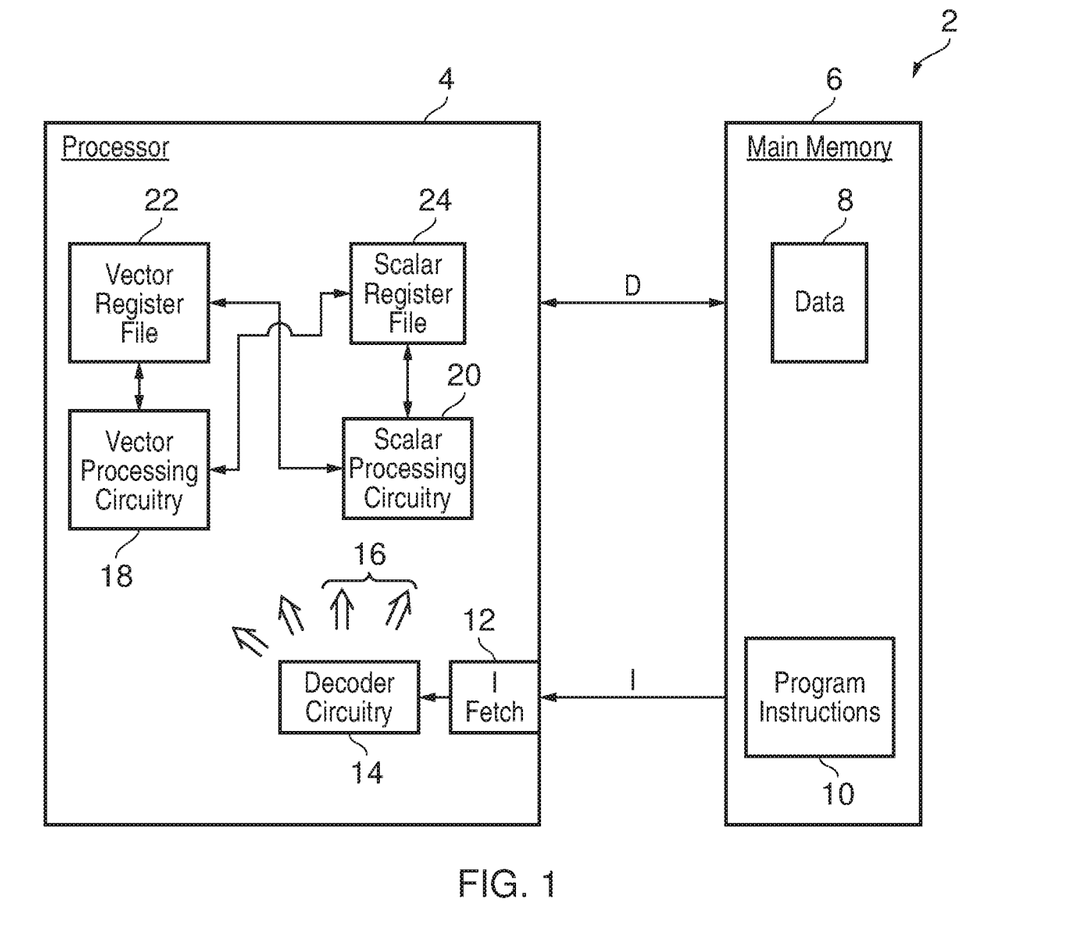
FIG. 1 schematically illustrates the data processing system supporting vector arithmetic instructions.

FIG. 1 schematically illustrates a data processing system 2 comprising a processor 4 coupled to a memory 6. The memory 6 stores data values 8 to the manipulated and program instructions 10 specifying data processing operations to be performed by the processor 4. Program instructions 10 are fetched by an instruction fetch unit 12 and passed to decoder circuitry 14. The decoder circuitry 14 generates control signals 16 which serve to control processing circuitry 18, 20, 22, 24 within the processor 4 to perform processing operations specified by the decoded instructions.

The processor 4 supports both vector operations and scalar operations. Vector processing circuitry 18 acting upon vector operands stored within a vector register file 22 serves to perform vector processing operations. Scalar processing circuitry 20 acting upon scalar operand values stored within a scalar register file 24 serves to perform scalar processing operations. It will be appreciated, vector processing operations can take a variety of different forms. For example, SIMD (Single Instruction Multiple Data) processing operations are one form of vector processing operation. More generally, a vector processing operation is performed upon a plurality of vector elements which together formed a vector operand.

The vector elements of the source operands and destination operands in conventional integer arithmetic instructions match. For example, a vector operand of 256 bits in length may be formed of 16 vector elements each of 16 bits of length. The processing operations performed upon the individual vector elements will typically be performed at least partially in parallel, but this need not always be the case. Scalar processing operations are performed with input operands comprising a single value, e.g. 64-bit scalar processing operations may be performed upon two 64-bit scalar input operands and generate a 64-bit scalar output operand.

The vector processing circuitry 18 is formed in accordance with the present disclosure to support at least one mixed-element-sized vector arithmetic instruction performed under control of control signal 16 generated by decoder circuitry 14 when a mixed-element-sized vector arithmetic instruction is fetched, decoded and executed.

Figure 2:
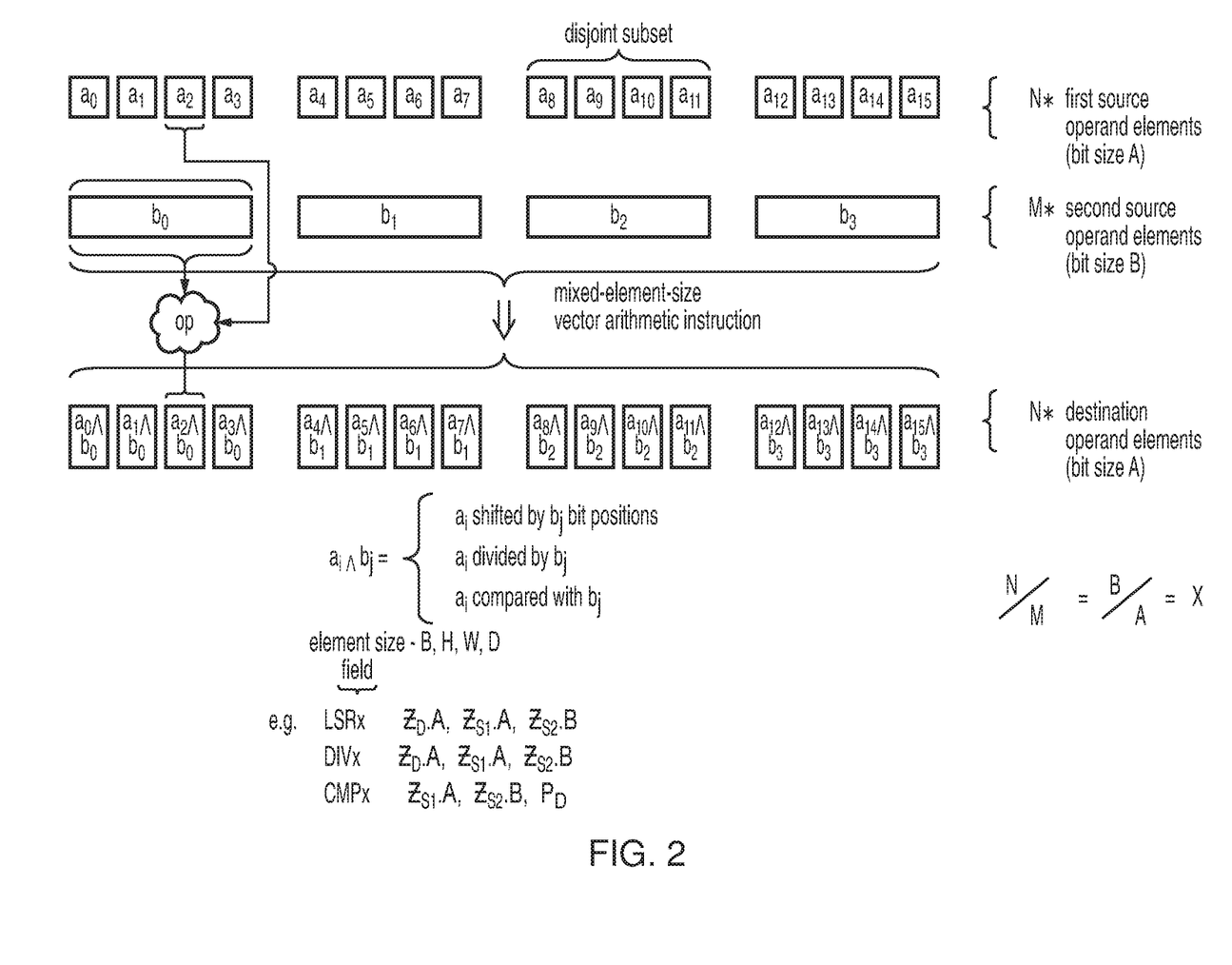
FIG. 2 schematically illustrates the operation and syntax of a mixed-element-sized vector arithmetic instruction.

FIG. 2 schematically illustrates the operation and assembler syntax of a mixed-element-sized vector arithmetic instruction. The mixed-element-sized vector arithmetic instruction performs an arithmetic processing operation, such as a logical shift, a division, or a compare, upon a first vector of first source operand elements $a_i$. In this example there are sixteen first source operand elements $a_0$-$a_{15}$. Each of these first source operand elements $a_i$ has a bit size of A. In this example 16 first source operand elements $a_i$ are arranged into 4 disjoint subsets $a_0$-$a_3$, $a_4$-$a_7$, $a_8$-$a_{11}$, and $a_{12}$-$a_{15}$. The mixed-element-sized vector arithmetic instruction has a second vector of second source operand elements $b_1$. In this example, the second vector of second source operand elements is formed of four second source operand elements namely second source operand elements $b_0$-$b_3$, each of bit size B.

While in this example embodiment there are sixteen first source operand elements and four second source operand elements, more generally there may be N first source operand elements and M and second source operand elements. The second source operand elements have a greater bit size B than the first source operand elements bit size A. In the example, where there are four times as many first source operand elements as there are second source operand elements, the ratio of the bit size B of the second source operand elements to the bit size A of the first source operand elements may be 4:1. This is the same as the ratio of the number of first source operand elements N to the number of second source operand elements M.

In this example embodiment, each of the disjoint subsets of first source operand elements is subject to an arithmetic processing operation with a respective one of the second source operand elements being the second operand input. More particularly, first source operand elements $a_1$-$a_3$ are subject to an arithmetic processing operation with the second source operand element $b_0$ being the second input to that arithmetic processing operation. For example, each of the first source operand elements $a_0$-$a_3$ may be separately subjected to a logical shift right by a shift amount specified by the second source operand element $b_0$. The resulting output operand has the same bit size A as the first source operand elements. Other example arithmetic processing operations may be performed for the mixed-element-sized vector arithmetic instruction e.g. a first source operand element $a_i$ being divided by a corresponding second source operand element $b_j$ or a first source operand element $a_i$ being subjected to a compare (subtract) with a corresponding second source operand element $b_j$.

One example syntax of the mixed-element-sized vector arithmetic instructions is illustrated at the bottom of FIG. 2. The arithmetic processing operation, such as a logical shift, divide or compare is specified by a mnemonic such as LSR, DIV or CMP. The instruction then specifies an element size for the first source operand elements, namely whether these are bytes B, half words. H, words W, or double words D. In the case of 64-bit double words D, a 512 bit vector operand would contain 8 such double words. The second source operand elements in such a case may be for example, 128-bit vector elements with two of the double word first source operand elements being associated with each of the 128-bit second source operand elements. It will be understood that many other different total vector sizes and vector element sizes may be employed depending upon the implementation and the requirements of the particular instruction set or the processing performed.

The syntax of the mixed-element-sized vector arithmetic instructions continues by specifying the destination vector register $Z_D$ together with its element bit size A. This is followed by specifying the vector register of the first source operand namely $Z_{s1}$ together with its element bit size A. Finally, the vector register $Z_{S2}$ of the second source operand together with their element bit size B is specified. This is an example of a mixed-element-sized vector arithmetic instruction having two input operands and one output operand. In the case of a compare instruction, two input operands may be specified with the result being written to a predicate register $P_D$ which contains a "true" or a "false" result corresponding to the result of comparing each element in $Z_{S1}$ with the wider elements in $Z_{S2}$ (subtraction).

In the case of the mixed-element-sized vector shift instruction LSR, the processing operation is a shift operation that shifts a first source operand element by a shift amount specified by a corresponding second source operand element. In the case of the mixed-element-sized vector arithmetic instruction being a division instruction, the arithmetic processing operation is a division operation that divides a first source operand element by a divisor specified by the corresponding second source operand element. In the case of the mixed-element-sized vector arithmetic instruction being a compare instruction, the arithmetic processing operation is a compare operation that compares a first source operand element with a corresponding second source operand element.

The element bit size of the first source operand elements is specified by an element size field "x", as mentioned above, which specifies whether the first source operand elements have the size of 8 bits, 16 bits, 32 bits or 64 bits. The second source operand elements may in some example embodiments have a bit size specified by a field within the mixed-element-sized instruction. However, in other example embodiments, such as the one illustrated in FIG. 2, the second source operand elements may have a fixed size, such as 64 bits or 128 bits. The first source operand elements are smaller in bit size then the second source elements. If the second source operand elements have a bit size of 64, then the first source operand elements will have a bit size of one of 8, 16 or 32.

Figure 3:
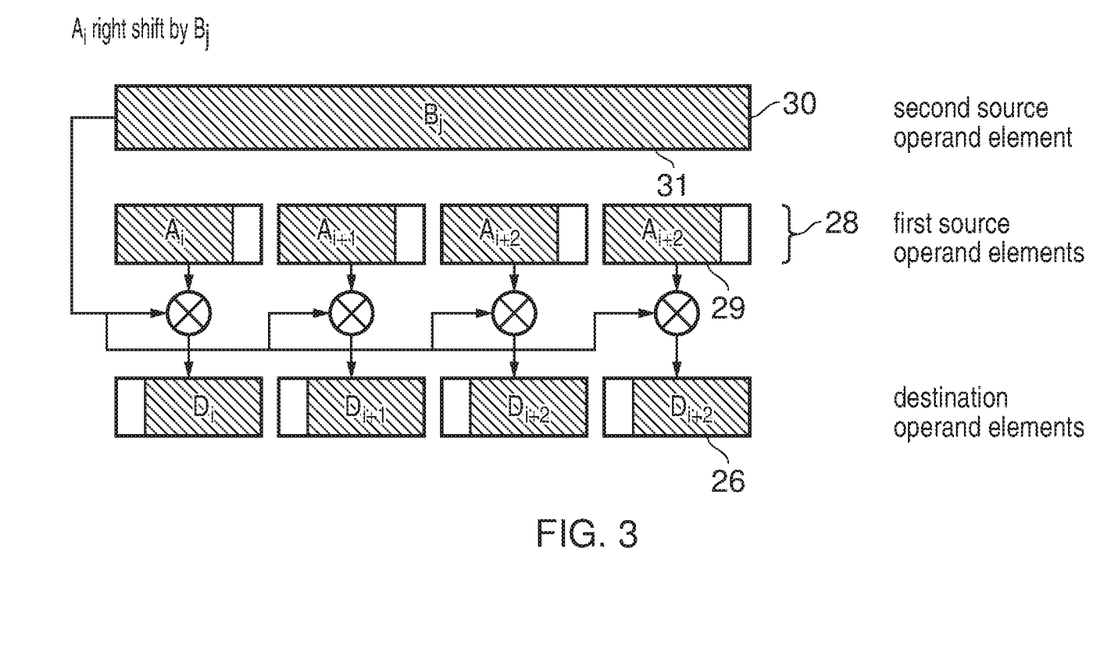
FIG. 3 schematically illustrates how a given bit in a destination operand of an arithmetic instruction is dependent upon input operand bits taken from different bit positions.

FIG. 3 schematically illustrates how an arithmetic instruction operates such that bit values 26 within a destination operand element are set in dependence upon one or more bit values of different bit significance within at least one of a corresponding first operand element 28 and second source operand element 30. In the case of the right shift of a first source operand element $A_i$ by a right shift amount specified by the second source operand element $B_j$, respective bit positions 26 in the destination operand D, are dependent upon corresponding bits 29 having a higher order significance within the first source operand element 28 together with all of the bits 31 within the second source operand 30 which specify the right shift amount to be applied.

The present disclosure teaches a system in which mixed-element-sized vector arithmetic instructions are supported. This is counter to the normal technical prejudice in this field. Normally all source operands for an arithmetic instruction all have a common element size. The present disclosure recognises that in certain circumstances the provision of mixed-element-sized vector arithmetic instructions provides advantages which justify the instruction bit space that such instructions consume within the instruction sets supported by the processor 4 and decoded by the decoder circuitry 14. When performing multiple operations of a program loop in parallel and that program loop has a scalar value operand, mixed-element-sized vector arithmetic instructions may be used to store copies of that scalar operand not sharing the same bit size as the first source operand elements for respective operations of the loop. At a practical level, the provision of mixed-element-sized vector arithmetic instructions may avoid the need to copy a scalar operand from the scalar register file 24 to the vector processing circuitry 18 upon each loop iteration, which can be a relatively slow process compared to the vector processing circuitry 18 accessing the vector register file 22 to which it is more directly coupled. Thus, for example, one use of the mixed-element-sized vector arithmetic instructions provided by the present disclosure is to copy a scalar operand value which contains more significant bits than the first source vector elements from the scalar register file 24 to each of the wider second source operand elements within a second vector operand. The second vector can then be used as one of the vector operand inputs to a mixed-element-sized vector arithmetic instruction which operates on a plurality of first source vector operand elements using the wider second source operand elements into which the scalar operand has been copied.

Figure 4:
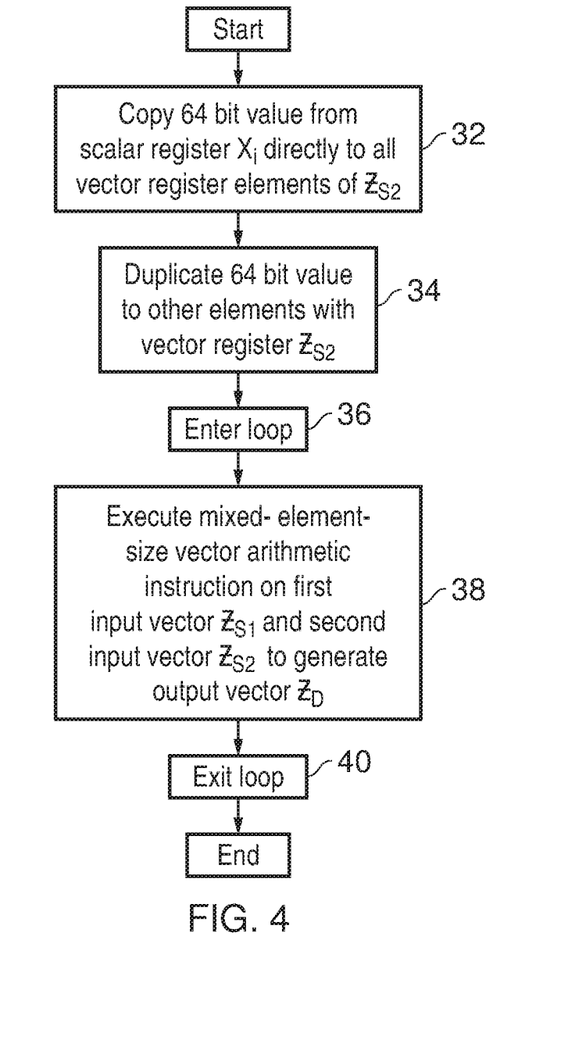
FIG. 4 is a flow diagram schematically illustrating use of a mixed-element-sized vector arithmetic instruction.

FIG. 4 is a flow diagram schematically illustrating one example of the above type of operation. At step 32 a 64-bit value from a scalar register $X_i$ is directly copied to all vector register elements of vector operand $Z_{S2}$. Step 34 then duplicates this 64-bit value from the vector register element to which is has been copied across all of the other vector register elements of the second vector. At step 36, a processing loop which is to be performed is entered. Step 38 executes mixed-element-sized vector arithmetic instructions on a first input vector $Z_{S1}$ and a second input vector $Z_{s2}$ to generate an output vector $Z_D$. At this stage, the multiple copies of the scalar register are present within appropriate elements of the second vector and accordingly do not need to be moved from the scalar register file 24 to the vector register file 22 as the processing proceeds. At step 40 the looping executed is exited.

It will be appreciated that the above is only one example use of mixed-element-sized vector arithmetic instructions. In the example of FIG. 2 there is a many-too-one relationship between first source operand elements $a_i$ and second source operand elements $b_j$ i.e. a disjoint subset arrangement whereby each disjoint subset of the first source operand elements has a single associated second source operand element. It will be appreciated that in some embodiments such a division of the first source operand elements and association with the second source operand elements need not be provided. The above example discusses arithmetic processing operations in the form of shift operations, division operations and compare operations. It will be appreciated that other forms of arithmetic operation may also be supported. The operands acted upon by the arithmetic operations may be binary number values where each bit has different positional significance such that the first source operand elements contain binary number values, the second source operand elements contain binary number values and the destination operand elements contain destination operand binary number values. In this way, the processing operation is performed on the binary number values as a whole rather than independent bitwise operations performed independently of other bits at different positions (such as OR, XOR or AND).

Figure 5:
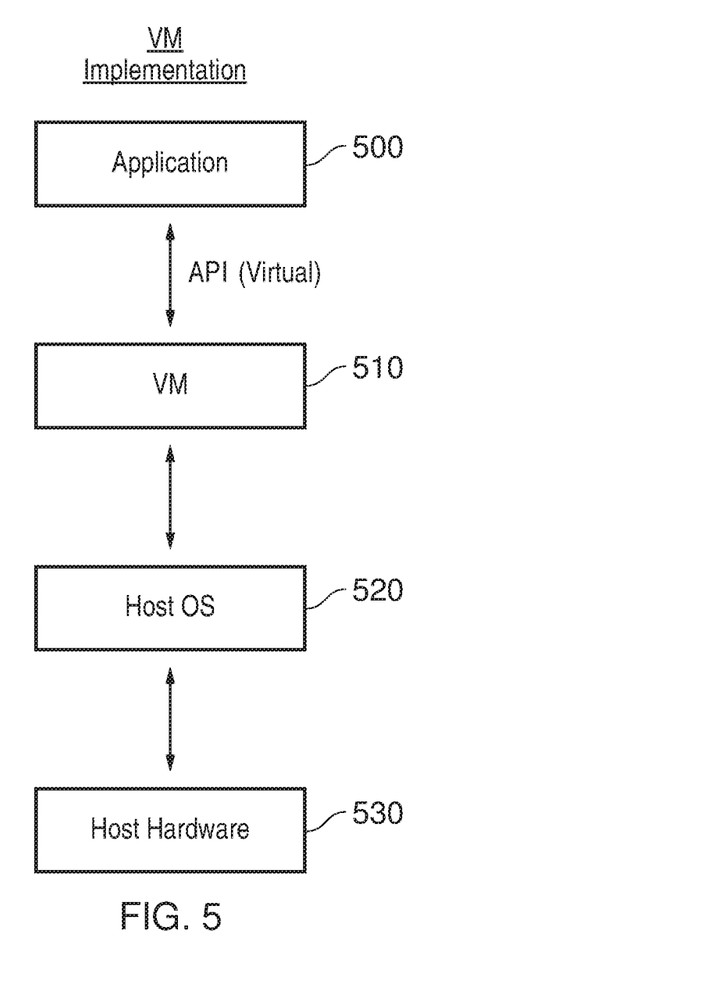
FIG. 5 schematically illustrates a virtual machine implementation.

FIG. 5 illustrates a virtual machine implementation that may be used. Whilst the earlier described embodiments implement the present invention in terms of apparatus and methods for operating specific processing hardware supporting the techniques concerned, it is also possible to provide so-called virtual machine implementations of hardware devices. These virtual machine implementations run on a host processor 530 running a host operating system 520 supporting a virtual machine program 510. Typically, large powerful processors are required to provide virtual machine implementations which execute at a reasonable speed, but such an approach may be justified in certain circumstances, such as when there is a desire to run code native to another processor for compatibility or re-use reasons. The virtual machine program 510 provides an application program interface to an application program 500 which is the same as the application program interface which would be provided by the real hardware which is the device being modelled by the virtual machine program 510. Thus, the program instructions, including the control of memory accesses described above, may be executed from within the application program 500 using the virtual machine program 510 to model their interaction with the virtual machine hardware.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. Apparatus for processing data comprising:
processing circuitry to perform processing operations; and
decoder circuitry to decode program instructions to generate control signals to control said processing circuitry to perform said processing operations; wherein
said decoder circuitry is responsive to a single mixed-element-sized vector arithmetic instruction to generate control signals to control said processing circuitry to perform an arithmetic processing operation upon a first vector of first source operand elements of a first bit size and a second vector of second source operand elements of a second bit size, said second bit size being greater than said first bit size,
wherein said first vector comprises N first source operand elements, said second vector comprises M second source operand elements, N and M are positive integer values, N is greater than M, and at least one of said second source operand elements serves as an input operand to said arithmetic processing operation performed with a plurality of different first source operand elements as a respective other input operand, and wherein N is X*M, where X is an integer greater than one, and each said second source operand element serves as an input operand to said arithmetic operation performed upon a respective disjoint subset of X of said first source operand elements.

2. Apparatus as claimed in claim 1, wherein said second bit size is X times said first bit size.

3. Apparatus as claimed in claim 1, wherein first source operand elements have a sequence ordering such that said respective disjoint subset comprises X adjacent first source operands within said sequence ordering.

4. Apparatus as claimed in claim 1, wherein said mixed-element-sized vector arithmetic instruction has a vector of destination operand elements, a bit value of a given positional significance within a given destination operand element being dependent upon one or more bits values of a different positional significance within at least one of a corresponding first source operand element and a corresponding second source operand element.

5. Apparatus as claimed in claim 4, wherein said first source operand elements are binary number values, said second source operand elements are binary number values and said destination operand elements are destination operand binary number values.

6. Apparatus as claimed in claim 4, wherein said vector of destination operand elements have a destination bit size equal to said first bit size.

7. Apparatus as claimed in claim 1, wherein said mixed-element-sized vector arithmetic instruction is a mixed-element-sized vector shift instruction and said arithmetic processing operation is a shift operation that shifts said first source operand elements by a shift amount specified by a corresponding second source operand element.

8. Apparatus as claimed in claim 1, wherein said mixed-element-sized vector arithmetic instruction is a mixed-element-sized vector division instruction and said arithmetic processing operation is a division operation that divides said first source operand elements by a divisor specified by a corresponding second source operand element.

9. Apparatus as claimed in claim 1, wherein said mixed-element-sized vector arithmetic instruction is a mixed-element-sized vector compare instruction and said arithmetic processing operation is a compare operation that compares said first source operand elements with a corresponding second source operand element.

10. Apparatus as claimed in claim 9, wherein said mixed-element-sized vector compare instruction has a vector of destination operand elements indicative of an outcome of a comparison between respective elements of said first vector and said second vector.

11. Apparatus as claimed in claim 1, wherein said first bit size is selected in dependence upon an element size field within said mixed-element-sized vector arithmetic instruction.

12. Apparatus as claimed in claim 11, wherein said first bit size is selected as one of 8 bits, 16 bits, and 32 bits.

13. Apparatus as claimed in claim 1, wherein said second bit size is fixed.

14. Apparatus as claimed in claim 1, wherein said second bit size is 64 bits.

15. Apparatus for processing data comprising:
processing means for performing processing operations; and
decoder means for decoding program instructions to generate control signals to control said processing circuitry to perform said processing operations; wherein
said decoder means is responsive to a single mixed-element-sized vector arithmetic instruction to generate control signals to control said processing means to perform an arithmetic processing operation upon a first vector of first source operand elements of a first bit size and a second vector of second source operand elements of a second bit size, said second bit size being greater than said first bit size, wherein said first vector comprises N first source operand elements, said second vector comprises M second source operand elements, N and M are positive integer values, N is greater than M, and at least one of said second source operand elements serves as an input operand to said arithmetic processing operation performed with a plurality of different first source operand elements as a respective other input operand, wherein N is X*M, wherein X is an integer greater than one, and each said second source operand element serves as an input operand to said arithmetic operation performed upon a respective disjoint subset of X of said first source operand elements.

16. A method of processing data comprising:
decoding a single mixed-element-sized vector arithmetic instruction to generate control signals to control processing circuitry to perform an arithmetic processing operation upon a first vector of first source operand elements of a first bit size and a second vector of second source operand elements of a second bit size, said second bit size being greater than said first bit size, wherein said first vector comprises N first source operand elements, said second vector comprises M second source operand elements, N and M are positive integer values, N is greater than M, and at least one of said second source operand elements serves as an input operand to said arithmetic processing operation performed with a plurality of different first source operand elements as a respective other input operand, wherein N is X*M, where X is an integer greater than one, and each said second source operand element serves as an input operand to said arithmetic operation performed upon a respective disjoint subset of X of said first source operand elements.

17. A computer program stored on a non-transitory storage medium for controlling a computer to provide a virtual machine execution environment corresponding to apparatus as claimed in claim 1.

* * * * *